No. 12,002.

Reissued June 24, 1902.

J. J. TUNNEY.

LUBRICATOR.

(Application filed Feb. 25, 1902.)

WITNESSES:

Geo. H. Harvey.

F. N. Barber.

INVENTOR,

John J. Tunney, by Wm. L. Pierce, his Attorney.

UNITED STATES PATENT OFFICE.

JOHN J. TUNNEY, OF PITTSBURG, PENNSYLVANIA, ASSIGNOR TO JOHN JENKINS, OF PITTSBURG, PENNSYLVANIA.

LUBRICATOR.

SPECIFICATION forming part of Reissued Letters Patent No. 12,002, dated June 24, 1902.

Original No. 679,246, dated July 23, 1901. Application for reissue filed February 25, 1902. Serial No. 95,640.

*To all whom it may concern:*

Be it known that I, JOHN J. TUNNEY, a citizen of the United States of America, residing at Pittsburg, in the county of Allegheny and State of Pennsylvania, have invented certain new and useful Improvements in Lubricators; and I do hereby declare the following to be a full, clear, and exact description thereof, reference being had to the accompanying drawings, which form a part of this specification.

This invention relates to certain new and useful improvements in lubricators, and has for its object the provision of novel means whereby a certain quantity of oil is automatically fed to a bearing at each revolution of a shaft.

The invention further aims to construct a device of this character which will possess advantages in points of simplicity, strength, durability, and cheapness.

Furthermore, the invention aims to construct a device that will be perfect in its operation at all times.

With the above and other objects in view the invention consists in the novel combination and arrangement of parts to be hereinafter more fully described, and specifically pointed out in the claims.

In describing the invention in detail reference is had to the accompanying drawings, forming a part of this specification, and wherein like numerals of reference indicate corresponding parts throughout the several views, in which—

Figure 1:
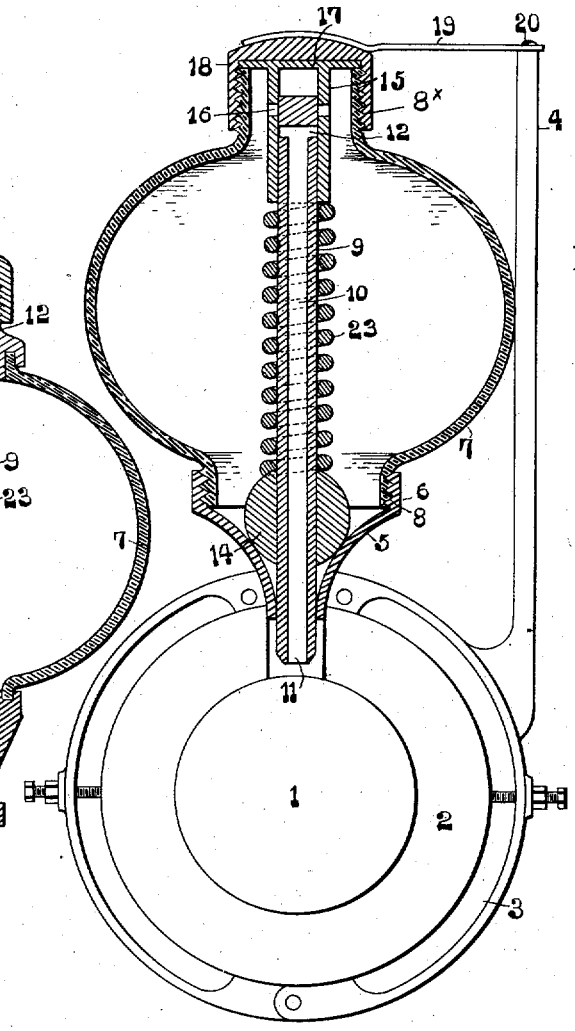
Figure 2:
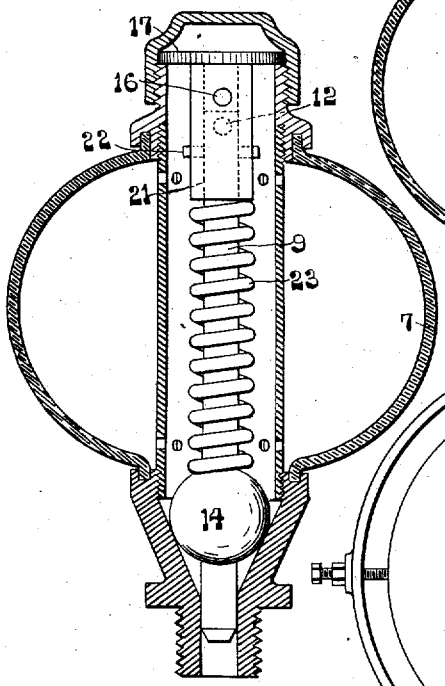
Figure 3:
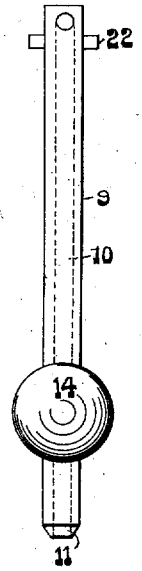
Figure 4:
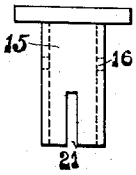
Figure 5:
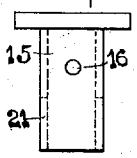
Figure 6:
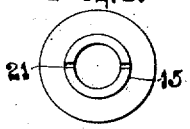

Figure 1 is a side elevation of the shaft and bearing, having arranged thereon my improved lubricator, the latter being shown in vertical section. Fig. 2 is a vertical sectional view of the lubricator detached. Fig. 3 is a front elevation of the stem. Fig. 4 is a side elevation of the nipple. Fig. 5 is a like view of the same, taken at right angles to Fig. 4. Fig. 6 is an inverted plan view of the nipple.

In the drawings the reference-numeral 1 indicates a shaft, and 2 the hub of a pulley, having secured thereto the annular section-ring 3, carrying the upright arm 4. The reference-numeral 5 represents a cone-shaped fitting, carrying interiorly-screw-threaded flange 6 to receive the spherical casing 7, which has a downwardly-extending screw-threaded portion 8. The reference-numeral 9 indicates an interior hollow stem, having a central opening 10 arranged therein and terminating at its lower extremity in a nozzle 11, extending loosely through the cone-shaped fitting 5, so as to slide freely therein. This stem is provided near its upper end with ports 12, extending transversely to the central opening 10 and communicating therewith. The said stem has secured near its lower end a weight 14, which is normally adapted to rest in the cone-shaped fitting 5. The extreme outer end of the tube is within the nipple or hollow body now to be described, so that the said end of the tube and the hollow body have a telescopic connection. The reference-numeral 15 represents a nipple or hollow body, having arranged therein ports 16, which are adapted to register with the ports 12 as the stem travels downwardly with each revolution of the lubricator, the said nipple having formed integral therewith at its upper extremity a head 17, which is adapted to rest upon the upper end of the upwardly-extending screw-threaded portion $8^{\times}$ of the spherical casing, the said nipple being held in position by means of the screw-threaded cap 18 engaging the exteriorly-screw-threaded portion of the extension. The said cap is likewise held in position by means of the spring-arm 19, secured at 20 to the arm 4. The reference-numeral 21 represents slots arranged in the nipple, which extend parallel to the axis thereof and form guideways for the reception of pins 22, secured to the hollow stem. The reference-numeral 23 indicates a spiral spring encircling the said stem, this spring being seated between the lower extremity of the nipple and the upper end of the weight.

The operation of my improved lubricator is as follows: With each revolution of the shaft and pulley the weight 14 will compress the spring 23, thereby forcing the stem outwardly to a point where the transversely-extending ports 12 will register with the ports 16 and allow the oil contained in the spherical casing or receptacle to enter the ports 16, into the port 12, down through the opening 10, and discharge by the nozzle 11 upon the shaft 1. As the shaft revolves the ports will again automatically close, caused by the gravity of the weight, the pins serving to guide the stem in the proper manner. It will be seen that the valve will be operated in this manner intermittently on each revolution of the shaft and that only a small amount of lubricant will be fed in the proper channels with each revolution. If the hub should be revolved at a high speed, centrifugal force would cause the ports 12 and 16 to register during the whole period of high revolution. It has been found that the oil is then fed in sufficient quantities to properly lubricate the pulley.

It will be noted that various changes may be made in the details of construction without departing from the general spirit of my invention.

Having thus fully described my invention, what I claim as new, and desire to secure by Letters Patent, is—

1. In a lubricator, a casing adapted to contain oil and to be secured to a revolving body, a hollow body secured to the casing, a tube longitudinally slidably connected to the hollow body, said body and tube being provided with lateral ports adapted to register and permit oil in the casing to pass into the interior of the tube, said tube conducting the oil toward the axis of the revolving body, and its extreme outer end being telescopic with the hollow body.

2. In a lubricator, a casing adapted to contain oil and to be secured to a revolving body, a hollow body secured to the casing, a tube longitudinally slidably connected to the hollow body, said body and tube being provided with lateral ports adapted to register and establish communication between the interior of the casing and of the tube, and to pass out of registry whereby said communication is broken, said tube conducting the oil toward the axis of the revolving body and its extreme outer end being telescopic with the hollow body.

3. In a lubricator, a casing adapted to contain oil and to be secured to a revolving body, a hollow body secured to the casing, a tube longitudinally slidably connected to the hollow body, said tube and hollow body being provided with lateral ports adapted to register and establish communication between the interior of the casing and of the tube, and means for causing the sliding of said tube, said tube conducting the oil toward the axis of the revolving body and its extreme outer end being telescopic with the hollow body.

4. In a lubricator, in combination with a fitting adapted for attachment to a revolving body, a casing secured to said fitting, a nipple connected to the upper end of said casing and having arranged therein ports, a hollow stem in which are arranged openings extending transversely thereto and adapted to register with the ports formed in the nipple, a weight arranged on said stem, and a spring encircling the said stem between said nipple and weight.

5. In a lubricator, in combination with a fitting adapted for attachment to the hub of a pulley, a casing secured to said fitting, a nipple connected to the upper end of said casing and having arranged therein ports, a hollow stem in which are arranged openings extending transversely thereto and adapted to register with the ports formed in the nipple, a weight arranged on said stem, a spiral spring encircling the said stem between said nipple and weight, and a screw-threaded cap adapted to hold said nipple in position.

6. In a lubricator, in combination with a fitting adapted for attachment to the hub of a pulley, a casing secured to said fitting, a nipple secured within the casing carrying a head and having formed therein a port, slots arranged in said nipple, a stem having a central opening and transversely-extending ports communicating therewith, pins arranged on said stem adapted to operate in said slots, a weight secured to said stem, a spiral spring encircling said stem, and a cap arranged upon the upper end of said spherical casing and engaging the head of the nipple.

7. In a lubricator, the combination with a cone-shaped fitting adapted for attachment to the hub of a pulley, a spherical casing secured to said cone-shaped fitting, a nipple connected to the upper end of said spherical casing and having arranged therein ports, a hollow stem in which are arranged openings extending transversely thereto and adapted to register with the ports formed in the nipple, a weight arranged on said stem, a spiral spring encircling the said stem between said nipple and weight, and a screw-threaded cap adapted to hold said nipple in position, substantially as described.

8. In a lubricator, in combination with a cone-shaped fitting adapted for attachment to the hub of a pulley, a spherical casing secured to said cone-shaped fitting, a nipple secured within the casing carrying a head and having formed therein a port, slots arranged in said nipple, a stem having a central opening and transversely-extending ports communicating therewith, pins arranged on said stem adapted to operate in said slots, a weight secured to said stem, a spiral spring encircling said stem, and a cap arranged upon the upper end of said spherical casing and engaging the head of the nipple, all parts being arranged and operating substantially as described.

In testimony whereof I have hereunto affixed my signature in the presence of two subscribing witnesses.

JOHN J. TUNNEY.

Witnesses:
F. N. BARBER,
M. W. CASKEY.